United States Patent
Brenig et al.

(10) Patent No.: US 7,317,911 B2
(45) Date of Patent: Jan. 8, 2008

(54) METHOD FOR OPERATING A TELECOMMUNICATIONS SYSTEM

(75) Inventors: Heinrich-Helmut Brenig, Meckenheim (DE); Detlef Firch, Koenigswinter (DE)

(73) Assignee: T-Mobile Deutschland GmbH and Deutsche Telekom AG, Bonn (DE)

( * ) Notice: Subject to any disclaimer, the term of this patent is extended or adjusted under 35 U.S.C. 154(b) by 563 days.

(21) Appl. No.: 10/258,690

(22) PCT Filed: Apr. 25, 2001

(86) PCT No.: PCT/DE01/01551

§ 371 (c)(1),
(2), (4) Date: Jun. 9, 2003

(87) PCT Pub. No.: WO01/82579

PCT Pub. Date: Nov. 1, 2001

(65) Prior Publication Data

US 2004/0038674 A1    Feb. 26, 2004

(30) Foreign Application Priority Data

Apr. 27, 2000 (DE) .............................. 100 20 567

(51) Int. Cl.
*H04M 3/00*    (2006.01)

(52) U.S. Cl. ..................... 455/418; 455/419; 455/403; 455/186.1; 455/558; 455/556.1; 348/142; 348/143; 348/144; 348/149; 348/14.02; 348/14.08

(58) Field of Classification Search ............. 455/556.1, 455/575.1, 573, 404.1, 564, 550.1, 90.1, 455/90.3, 422.1, 414.2, 411, 445, 550, 418; 340/506, 531, 511
See application file for complete search history.

(56) References Cited

U.S. PATENT DOCUMENTS

| | | | | | |
|---|---|---|---|---|---|
| 5,745,849 | A | * | 4/1998 | Britton | 455/404.1 |
| 6,157,823 | A | * | 12/2000 | Fougnies et al. | 455/406 |
| 6,512,919 | B2 | * | 1/2003 | Ogasawara | 455/422.1 |
| 6,681,120 | B1 | * | 1/2004 | Kim | 455/556.1 |

* cited by examiner

*Primary Examiner*—Joseph Feild
*Assistant Examiner*—Randy Peaches
(74) *Attorney, Agent, or Firm*—Myron Greenspan Lackenbach Siegel LLP

(57) ABSTRACT

The invention relates to a method for operating a telecommunications system and to a corresponding telecommunications system comprising at least one centralized device and at least one telecommunications terminal device, which is configured for communicating with the centralized device and/or other telecommunications terminal devices. The invention is characterized in that one or more control programs are stored in the centralized device, whereby the control programs can be activated by signals of the telecommunications terminal device in order to initiate one or more functions in the telecommunications terminal device, in the centralized device and/or in other telecommunications terminal devices.

25 Claims, 4 Drawing Sheets

METHOD FOR OPERATING A TELECOMMUNICATIONS SYSTEM

BACKGROUND OF THE INVENTION

1. Field of the Invention

The invention relates to a method for the operation of a telecommunication system and a telecommunication system according to the preamble of the independent patent claims.

2. Description of the Prior Art

Telecommunication systems, in particular digital mobile radio systems, are enjoying increasing popularity since they ensure that subscribers can nearly always be reached and be reached at any place. Apart from the basic function of telephony, modern mobile radio terminal sets offer many additional services such as news headlines service, telefax, e-mail and central announcement and information services, in which the subscriber can call up current information by dialing a specific telephone number.

Other services and additional functions are also known. From DE 44 13 974 A1 and published patents building thereon, for example DE 196 29 535 C2, telephone handsets of a wireless telephone installation or mobile telephone are known which have either an emergency call key and a store for an emergency text and/or a multifunction key, via which control programs can be activated, which are stored in a read-only memory or a programmable store of the handset.

Since it cannot be assumed that all terminal device manufacturers will carry out the further development of their terminal devices according to identical criteria, but rather aim for differentiation against their competitors, for the potential user of such terminal devices and the functions (for example monitoring functions) which can be activated via such, the disadvantage is encountered of not being able to freely select a terminal device supplier. The primary implementation of such functions in wireless handsets moreover represents a restriction in the utilization of such functions.

The invention has as its object to propose a method for operating a telecommunication system and a corresponding telecommunication system, with which the utilization of one or several different additional services is possible independently of the employed communication system and telecommunication terminal devices.

SUMMARY OF THE INVENTION

The posed problem is solved according to the invention through the characteristics of the independent patent claims.

The method and the telecommunication system according to the invention are distinguished in that one or several control programs are stored in the central device, with the control programs being activatable or deactivatable through signals of the telecommunication terminal device in order to initiate one or several functions in the telecommunication terminal device, the central device and/or in other telecommunication terminal devices or to terminate the function.

The advantage of the invention lies in the utilization of central devices in the form of control units, which can be implemented in diverse telecommunication networks corresponding to the succeeding applications/functions and in which different control programs are stored, which are activatable from any desired telecommunication terminal devices and which in the terminal devices, the central device and/or other terminal devices initiate functions which make possible the utilization of monitoring and other additional functions in a general, device-independent form or which are deactivatable for the termination of the functions. The functions can therein include utilizing and transmitting information such as voice, data, text, video, etc.

The described method is independent of the type of telecommunication system, for example mobile radio system and/or land-line network, and also independent of the employed telecommunication terminal devices and telecommunication carriers. By utilizing (activation/control) central control units on one or on different device-independent communication carrier systems, different services can be utilized individually or several simultaneously with one or, depending on the service, with several terminal devices and sets available on the market.

In a preferred embodiment of the invention the control programs in the central device are activated by signals of the telecommunication terminal device, which are triggered via specific keys, such as function keys, programmable keys and/or speed-dial keys of the telecommunication terminal device. The signals can alternatively be triggered by voice input or also by specific events, for example, under time control.

A feasible control program operates as a room monitoring program, in which a call indicator device of the telecommunication terminal device is switched mute, a volume level device succeeding a microphone of this terminal device is activated for generating a sound signal if a noise level acquired by the microphone exceeds a predetermined noise level, by means of the sound signal the dialing of a call number stored in the terminal device of the central device is activated and a connection to the central device is established, and a call number saved there is dialed after passage of a predetermined time period. This function is useful for example for monitoring infants and small children or for burglary monitoring.

After activation of the room monitoring program and after dialing the stored call number, a confirmation message is advantageously output on the part of the dialed call number back to the central device or to the telecommunication terminal device. It is therein provided that in the absence of a confirmation by the call number or a dialed connection, the calling process is optionally also repeated to other previously defined call numbers at previously defined time intervals, and the central unit saves the dialing processes to the call number together with information regarding time. The saved calling processes can be called up from the central unit together with the time information. Therewith a check of the proper working order of the room monitoring function is possible.

Another control program provided according to the invention operates as an active emergency call program, in which one or several specific keys of the telecommunication terminal device have the function of an emergency call key, upon the actuation of which an emergency call signal is sent to the central device, which forwards this emergency call further to a call number stored in the control program of the central unit.

In the event the active emergency call program is activated, it can be provided that upon actuation of a specific key an emergency call number, stored in the central device is dialed, to which a message saved in the central device is sent.

Another control program provided according to the invention operates as a person surveillance program, in which one or several specific keys of the terminal device have the function of a reset key, and in a monitoring program of the central device an emergency signal or dialing to a call number stored in the central unit is generated if the reset key, after activation of the person surveillance program, is not actuated within a period of time presettable by a timer in the central unit, and the presettably period of time starts anew if the reset key is actuated. Thereby the monitoring of a person, for example of ill or old people, is possible.

A further development of the invention provides a warning device, which, with activated person surveillance program in the central device, after passage of a presettable time interval during a warning interval generates a visual and/or acoustic warning signal, wherein an emergency signal is generated if the reset key after the start of the warning signal is not actuated within a warning interval, and the time interval after actuation of the reset key starts over again.

It can further be provided that, with the person surveillance program activated, in the presence of an emergency signal a predetermined emergency call number is dialed and to this number information or a message stored in the program of a central device is sent.

According to the invention further a control program is developed as a passive emergency call program, in which a motion sensor is provided for generating a motion signal, a threshold value device succeeding the motion sensor generates a trigger signal if the motion signal during a predetermined time period is below a predetermined threshold value, and, in the presence of the trigger signal, a device activates the transmitting/receiving unit of the telecommunication terminal device for sending a call signal to the central device or other terminal devices.

The motion sensor can advantageously be developed as an acceleration sensor or a position sensor and can be externally connected to the telecommunication terminal device or be integrated in it.

The activated passive emergency call program preferably generates an emergency signal in the central device or a call to a call number stored in the central unit. The emergency call signal can therein be an acoustic signal output over the loudspeaker of the telecommunication terminal device.

With the passive emergency call program activated, it can further be provided that, together with the call signal, information stored in the program of a central device is sent to any desired receiver.

A further development of the invention provides that the location of the telecommunication terminal device is automatically acquired by means of known position finding methods, for example GPS, bearing taking, timing the interval between transmission and echo return, etc., by the central device and/or the telecommunication terminal device, is processed and made available to the control programs.

In another further development of the invention a call forwarding device is provided in the central unit, which, for example with the room monitoring program activated, forwards incoming calls to another terminal device. Further, in the control program of the central device a function for the recognition of specific calls or call numbers can be set up, wherein in the presence of a specific call without activation of the call indicator device a connection of the caller with the called telecommunication terminal device is established.

In the telecommunication terminal device advantageously a storage package is available, which, for example with the room monitoring program activated, saves signals picked up by a microphone and/or a camera of the terminal device if a threshold value is exceeded until a connection from the terminal device via the central device to another terminal device has been established. Further, a device can be provided which, via the central device, establishes a connection to the other terminal device and transmits the saved signals to the other terminal device.

The storage function can also be assumed by the central device if a connection between the sending telecommunication terminal device and the central device has already been established.

As a cost control measure for the subscriber it is further possible that a connection time limitation device settable by the subscriber in a central device is provided, which, for example with the room monitoring program activated, interrupts the connection between telecommunication terminal device and central device and/or other telecommunication terminal devices if a presettable fee or time limit has been exceeded.

BRIEF DESCRIPTION OF THE DRAWINGS

An embodiment example of the invention will be explained in the following in conjunction with several Figures in the drawing. Based on the Figures and their description further characteristics and advantages of the invention are evident. Therein depict.

DESCRIPTION OF THE PREFERRED EMBODIMENTS

Figure 1:
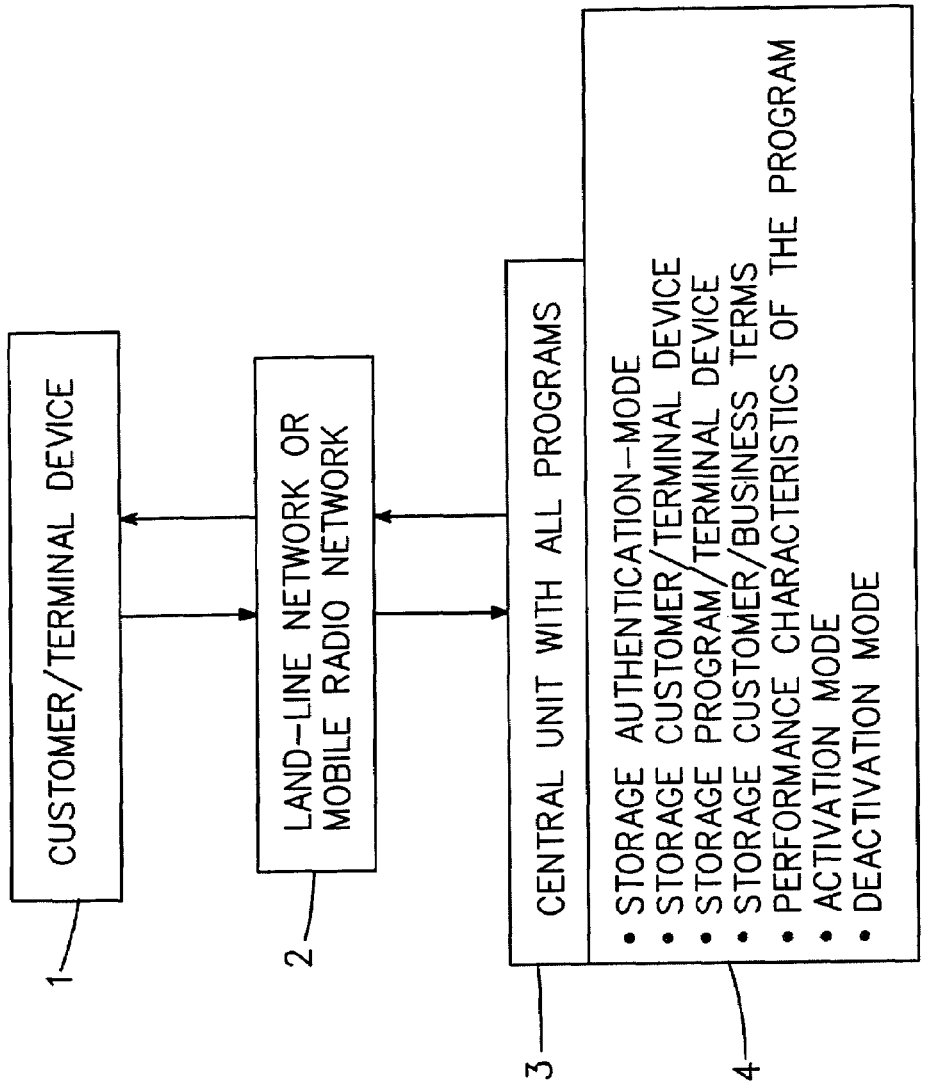
FIG. 1 a schematic overview over the telecommunication system according to the invention, FIG. 2 the schematic structure of the telecommunication system, FIG. 3 representation of room monitoring with the application of the method and the telecommunication system according to the invention.

In FIG. 1 a schematic overview over the telecommunication system according to the invention is shown. With his telecommunication terminal device 1 the customer communicates across a communication network 2 with a central device 3. The communication network 2 can therein be optionally a land-line network or a mobile radio network or another suitable communication network.

In addition to general devices and functions, various control programs are stored in the central device 3, which can be activated or deactivated by signals of the telecommunication terminal device 1 in order to initiate one or several functions in the telecommunication terminal device 1, the central device 3 and/or in other telecommunication terminal devices or to switch these functions passive or to terminate them. Apart from these control programs, the central device 3 comprises functions for storage and authentication of the subscriber or his terminal device 1, functions for the storage of data of the customer or information of the terminal device 1, functions for the storage of programs, functions for storage of customer data or business terms, a list about the performance characteristics of the control programs, an activation mode controllable by the subscriber or the terminal device 1 as well as a corresponding deactivation mode for the functions in the central device 3.

Figure 2:
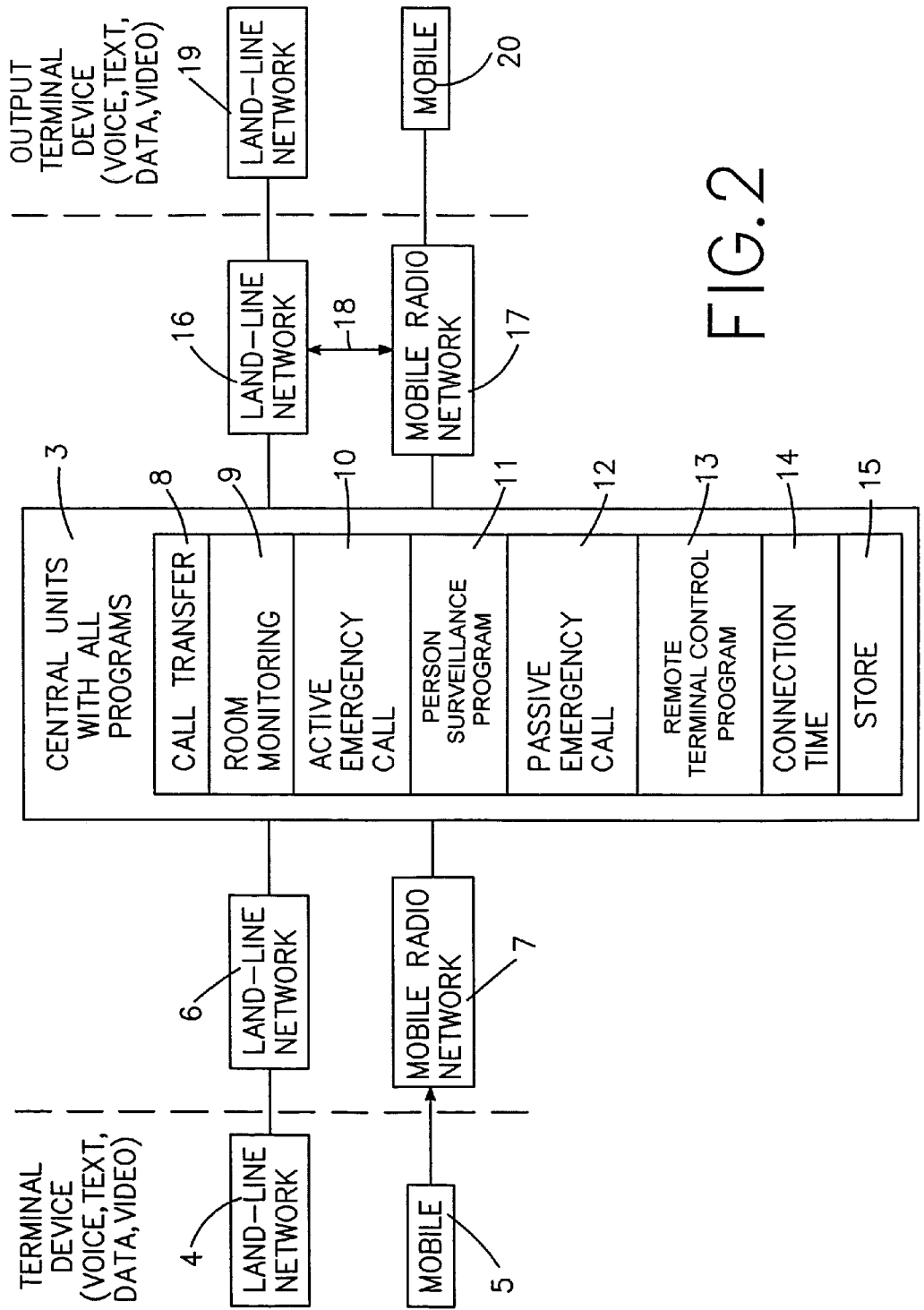
Figure 3:
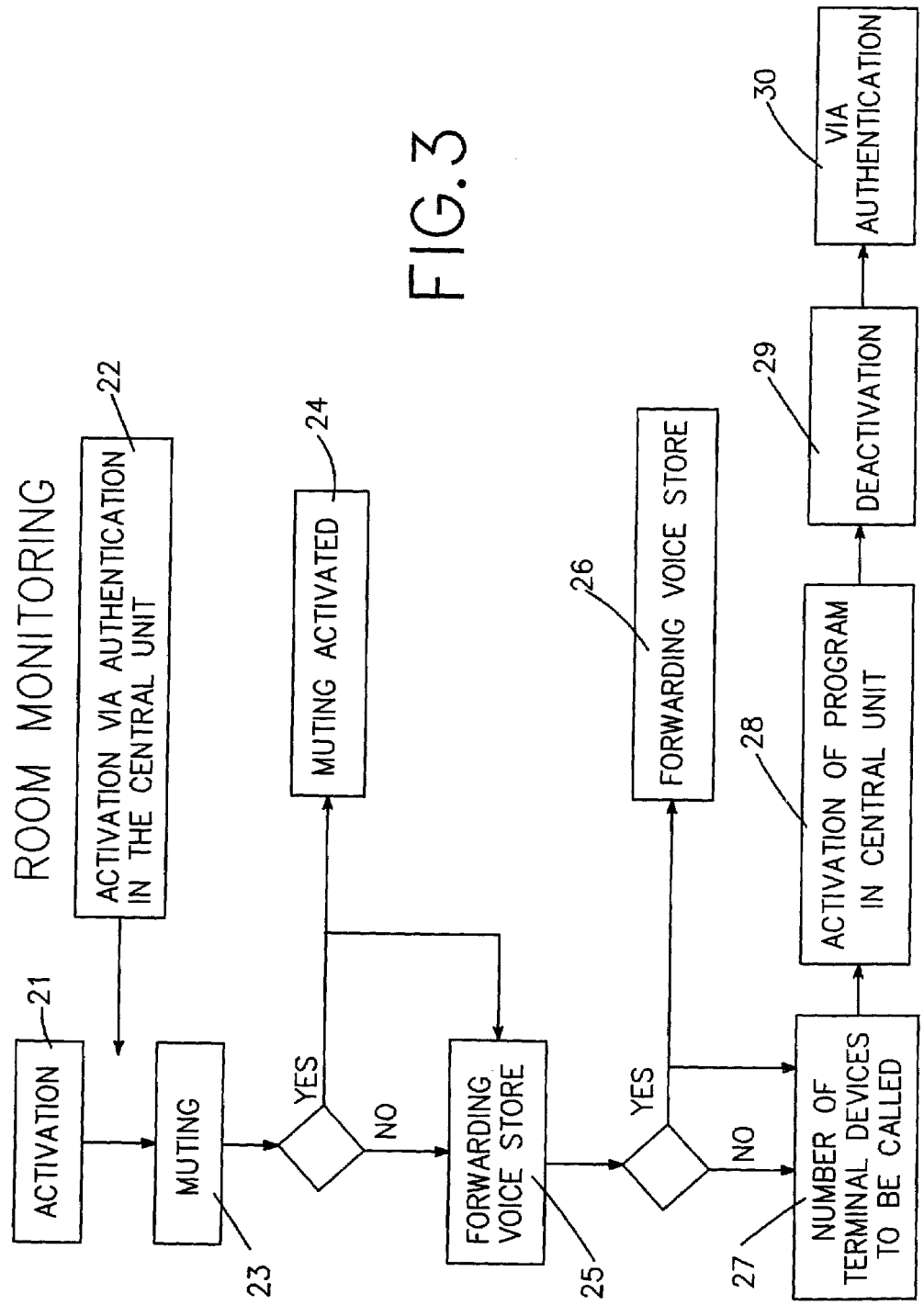

FIG. 2 shows the schematic structure of the telecommunication system wherein at the center are located the central unit or the central units 3 with the corresponding control programs. By means of suitable telecommunication terminal devices 4, 5, which can be developed as land-line network terminal devices 4 or mobile terminal devices 5, over the particular telecommunication network, which means, land-line network 6 or mobile radio network 7, a connection can be established to the central unit 3. This connection is triggered or activated through signals of the telecommunication terminal devices 4, 5, whereupon preferably specific functions are initiated in the telecommunication terminal device 4, 5. These functions which are initiated in the telecommunication terminal devices 4, 5 are initiated and controlled by control programs 8 to 14 held in the central unit 3, wherein corresponding information or control programs for the control of the telecommunication terminal devices 4, 5 are sent over the communication network 6, 7 to the corresponding terminal device 4, 5.

The central unit 3 comprises according to the invention a function of call forwarding by means of a call transfer or forwarding program 8, which ensures that in the presence of a call, for example for the telecommunication terminal set 4, via its call number the customary acoustic and/or visual call indicator device remains mute and the call is forwarded to another call number predetermined by the subscriber or owner of the terminal device 4.

A room monitoring program 9 offers the capability of transmitting for example noises, picked up by the microphone of the terminal device 4, over the telecommunication network 6 to the central unit 3 and further over a telecommunication network 16 to another terminal device 19, which terminal device by identification of its call number can be freely preset by the user of the terminal device 4.

The acoustic monitoring signals of the terminal device 4 can also be placed into intermediate storage module 15 of the central unit 3 and be made available to be called up by, for example, the terminal device 19. By means of a remote terminal control program 13 it can be provided that the subscriber of the terminal device 4, whose call number is saved in the central unit, can establish from any desired terminal device 19 a connection via the central unit 3 to the terminal device 4 and thereby a connection with the microphone and the loudspeaker of the terminal device 4 is established such that the subscriber has direct access to the room to be monitored, in which the terminal device 4 is located.

A further program module in the central unit 3 is the active emergency call program 10, which is activated if, for example, in the terminal device 4 a specific emergency call key is actuated, such that subsequently steps predetermined by the active emergency call program 10 are initiated and executed by the central unit 3, for example the establishment of a connection over the mobile radio network 17 to a mobile terminal set 20, with which the emergency call of the terminal device 4 is received.

A further program module is the person surveillance program 11, which can be activated for example through the terminal device 5. Therein a key of the terminal device 5 has the function of a delete key and in the central device 3 an emergency signal is generated if the delete key of the terminal device 5 after activation of the person surveillance program 11, is not actuated within a time period presettably through a timer, wherein the presettable time period starts anew if the delete key is actuated. The timer can therein either be disposed in the terminal device 5 or in the central unit 3.

In connection with for example the terminal device 5 and a motion sensor connected with the terminal device 5, a passive emergency call program 12 makes possible to generate an emergency call signal if the motion sensor does not output a sufficient motion signal for a specific period of time. This makes it possible for the terminal device 5 to output an emergency call signal even if its carrier is no longer in the position to operate it.

A further program module provided in the central unit 3 is the monitoring of the connection time 14, wherein by the subscriber the connection between telecommunication device, for example 4, and central device 3 and/or other telecommunication devices 19, is interrupted if a presettable fee or time limit has been exceeded.

A program module of the central unit 3 will now be described in conjunction with the room monitoring 9. In a first method step 21 the activation of the room monitoring program 9 takes place by actuation by the subscriber of a function key 37 of a terminal device 31 (cf. FIG. 4). This activation initiates a communication connection between the terminal device over a telecommunication network to the central device 3 (cf. FIG. 2). After the connection has been established, authentication of the subscriber is performed in the central unit 3 according to method step 22. If the subscriber is authorized to utilize the room monitoring function, a muting of the call indicator device of terminal device 31 preferably takes place, in order for the person to be monitored, for example an infant, not to be disturbed (step 23, 24). If muting is not desired, method step 24 is omitted, and the procedure moves to method step 25, which offers the capability of forwarding the signals picked up by the terminal device 31 into a store 15, 46, which is either disposed in terminal device 31 or the central unit 3.

If such is desired, the forwarding of the signals picked up by the terminal device, takes place into the store (step 26). If such is not desired, a query takes place by the central unit of the call number of the terminal device to be dialed to which the acoustic signals picked up by the terminal device 31 are to be transmitted (step 27). Subsequently the execution proper of the room monitoring program in the central unit 3 (step 28) takes place, wherein via a telecommunication network 16 the connection to a terminal device 19 is established based on the call number to be dialed (FIG. 2). However, preferably a connection is only set up between the terminal devices 31 and 19 if the noise level picked up by the terminal device 31 exceeds a certain threshold value. If the room monitoring program is no longer desired, then according to step 29 the deactivation of the program takes place via a repeat authentication (step 30) of the corresponding subscriber.

Activation of the different program modules as well as also the output via a terminal set can take place via the land-line network transmission route (terminal device 4 and telecommunication network 6) as well as also via the mobile radio transmission route (terminal device 5 and telecommunication network 7). The mixed utilization of landline network transmission route and mobile radio transmission route is also possible.

Figure 4:
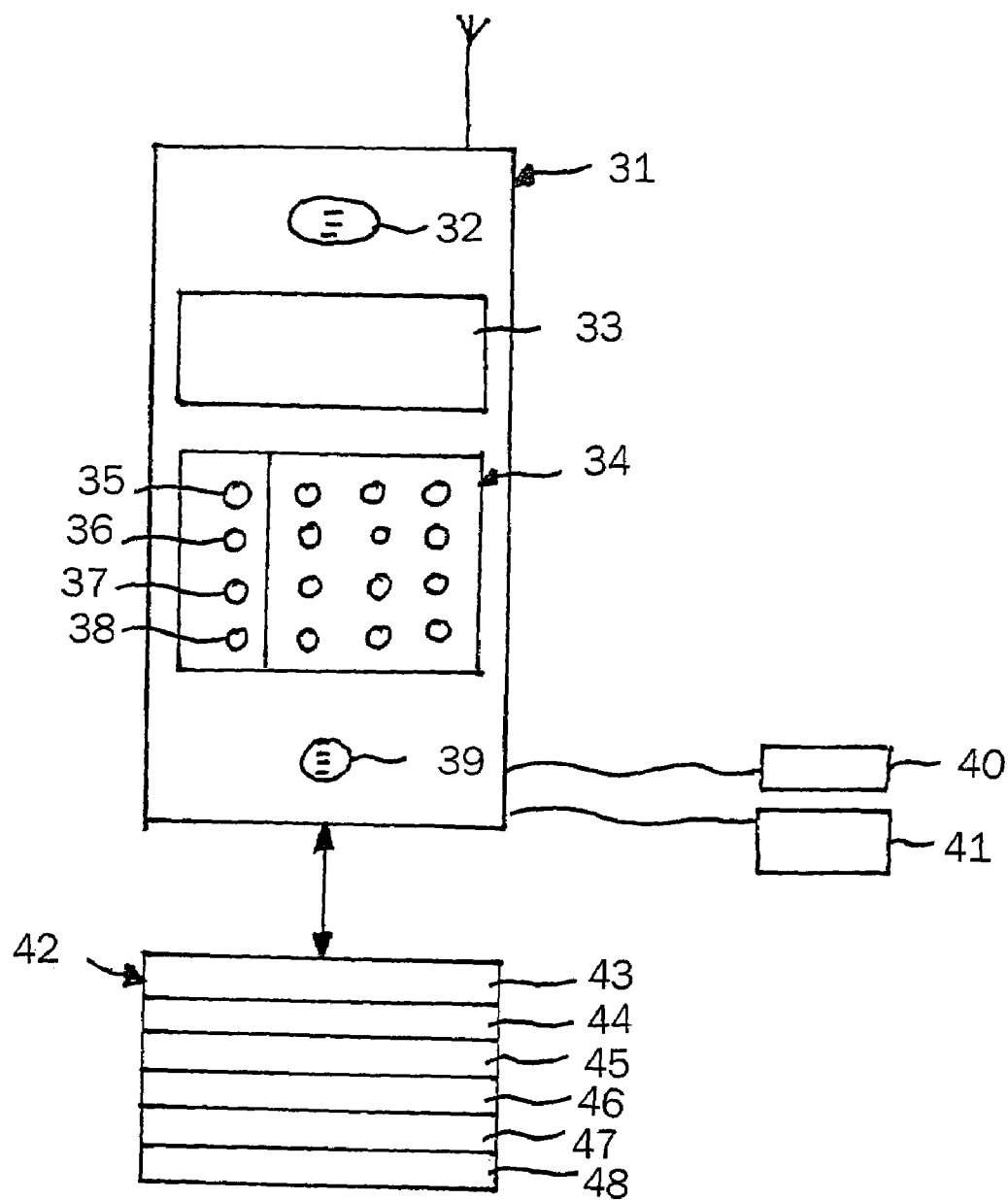
FIG. 4 schematic representation of a communication terminal set for application with the method according to the invention.

FIG. 4 depicts a schematic representation of a communication terminal set 31 for use with the method according to the invention. The communication terminal set 31 can be developed in the form of a mobile radio terminal set, which comprises an operating part and a software/hardware module 42, which are accommodated in a common housing (not shown).

The mobile telephone 31 comprises a loudspeaker 32, a display unit 33, a keypad 34, different multifunction or special keys 35 to 38, such as emergency call key, reset key, function key and speed-dial key, as well as a microphone 39. The software/hardware module 42 of the mobile telephone 31 can comprise different devices and functions, such as for example a device for voice recognition 43, a device 44 for detecting a certain volume level of the microphone 39, a device 45 for detecting a threshold value of externally or internally generated signals, a store device 46, a GPS position finding system 47 as well as a timer 48. To the mobile telephone 31 can be connected as external modules for example a motion sensor 40 as well as a camera module 41, which can also be integrated in the mobile telephone.

| Legends | | |
|---|---|---|
| | 1 | Telecommunication terminal device |
| | 2 | Telecommunication network |
| | 3 | Central unit |
| | 4 | Terminal device (land line) |
| | 5 | Terminal device (mobile) |
| | 6 | Telecommunication network (land line) |
| | 7 | Telecommunication network (mobile) |
| | 8 | Program module |
| | 9 | Program module |
| | 10 | Program module |
| | 11 | Program module |
| | 12 | Program module |
| | 13 | Program module |
| | 14 | Program module |
| | 15 | Storage module |
| | 16 | Telecommunication network (land line) |
| | 17 | Telecommunication network (mobile) |
| | 18 | Network transition |
| | 19 | Terminal device (land line) |
| | 20 | Terminal device (mobile) |
| | 21 | Method step |
| | 22 | Method step |
| | 23 | Method step |
| | 24 | Method step |
| | 25 | Method step |
| | 26 | Method step |
| | 27 | Method step |
| | 28 | Method step |
| | 29 | Method step |
| | 30 | Method step |
| | 31 | Mobile radio terminal set |
| | 32 | Loudspeaker |
| | 33 | Display device |
| | 34 | Keypad |
| | 35 | Emergency call key |
| | 36 | Reset key |
| | 37 | Function key |
| | 38 | Speed-dial key |
| | 39 | Microphone |
| | 40 | Motion sensor |
| | 41 | Camera module |
| | 42 | Software/hardware module |
| | 43 | Voice recognition |
| | 44 | Volume level detection |
| | 45 | Threshold value detection |
| | 46 | Store |
| | 47 | GPS position finding |
| | 48 | Timer |

The invention claimed is:

1. Method for the operation of a telecommunication system with at least one central unit and at least one telecommunication terminal device for communication with said at least one central unit and/or other telecommunication terminal devices, comprising the steps of storing wherein said at least one central unit (3) a plurality of control programs, wherein said plurality of control programs are activatable by signals of the telecommunication terminal device (1; 4; 5) in order to initiate at least one function in the telecommunication terminal device, the central device and/or in other telecommunication terminal devices (19; 20), and further recognizing specific calls or call numbers of a called telecommunication terminal device by means of a remote terminal control program (13) of said at least one central unit, wherein in the presence of a specific call number without activation of a call indicator device a connection between the caller and the called telecommunication terminal device is established.

2. Method as claimed in claim 1, wherein the control programs are activated by signals of the telecommunication terminal device, which are triggered by specific keys, such as function keys, programmable keys and/or speed-dial keys of the telecommunication terminal device.

3. Method as claimed in claim 1, wherein the control programs are activated by signals of the telecommunication terminal device, which are triggered by voice input or by specific events.

4. Method as claimed in claim 1, wherein a control program operates as a room monitoring program, in which a call indicator device of the telecommunication terminal device is muted, a volume level device succeeding a microphone of this terminal device for generating a sound signals upon a noise level picked up by the microphone exceeding a predetermined one, is activated, and, by means of the sound signal, the dialing of a call number of the central device, saved in the terminal device, is activated and a connection to the central device is established, and a call number contained in the control program saved there is dialed after passage of a predetermined period of time.

5. Method as claimed in claim 1, wherein after activation of the room monitoring program and after dialing the stored call number, a confirmation message is sent by the dialed call number.

6. Method as claimed in claim 1, characterized in that wherein in the absence of confirmation by the call number or a dialed connection, the dialing process is repeated at previously defined time intervals, and the central unit saves the dialing processes to the call number together with time information.

7. Method as claimed in claim 1, wherein the saved dialing processes can be called up from the central unit together with the time information.

8. Method as claimed in claim 1, wherein a control program operates as an active emergency call program, in which one or several specific keys of the telecommunication terminal device have the function of an emergency call key, upon the actuation of which an emergency call signal is sent to the central device, which forwards this emergency call to at least one call number stored in the control program of the central unit.

9. Method as claimed in claim 1, wherein with the active emergency call program activated, upon actuation of a specific key of the terminal device an emergence call number stored in the central device is dialed and a message stored in the central device is sent to a specific receiver.

10. Method as claimed in claim 1, wherein with the person monitoring program activated, in the event of an emergency signal at least one predetermined emergency call number is dialed and to it is sent information or a message stored in the program of a central device.

11. Method as claimed in claim 1, wherein a control program operates as a passive emergency call program, in which a motion sensor is provided for generating a motion signal, a threshold value device succeeding the motion sensor generates a trigger signal if the motion signal during a predetermined time period is below a predetermined threshold value, and, in the presence of the trigger signal, a device activates the telecommunication terminal device for sending a call signal to the central device or other terminal devices.

12. Method as claimed in claim 1, wherein the motion sensor is an acceleration sensor or a position sensor.

13. Method as claimed in claim 1, wherein the motion sensor can be externally connected to the telecommunication terminal device.

14. Method as claimed in claim 1, wherein through the call signal in the central unit a passive emergency call program is activated, which generates an emergency signal or a call to at least one call number stored in the central unit.

15. Method as claimed in claim 1, wherein the emergency call signal is an acoustic signal output via a loudspeaker of the telecommunication terminal device.

16. Method as claimed in claim 1, wherein with the passive emergency call program activated, together with the call signal information stored in the program of a central device is sent to any desired receiver.

17. Method as claimed in claim 1, wherein the location of the telecommunication terminal device is automatically acquired by means of known position finding methods by the central device and/or the telecommunication terminal device, is processed and made available to the control programs.

18. Method as claimed in claim 1, wherein a call forwarding device is provided in the central unit, which, with the room monitoring program activated, forwards incoming calls to another terminal device.

19. Method as claimed in claim 1, wherein in the telecommunication terminal device a storage package is present, which, with the room monitoring program activated, saves signals picked up by a microphone and/or a camera of the terminal device when a threshold value is exceeded, as long as a connection via a central device to another terminal device is established, and/or a device is available, which via the central device establishes a connection to the other terminal device and transmits the saved signals to this other terminal device.

20. Method as claimed in claim 1, wherein the storage function is assumed by the central device as soon as a connection between the sending telecommunication terminal device and the central device is established.

21. Method as claimed in claim 1, wherein in the central device a connection time limitation device settably by the subscriber is provided, which interrupts the connection between telecommunication terminal device and central device and/or other telecommunication terminal devices if a presettable fee or time limit is exceeded.

22. Method for the operation of a telecommunication system with at least one central unit and at least one telecommunication terminal device, for communication with the central unit and/or other telecommunication terminal devices, wherein said at least one central unit (3) includes at least one control program stored therein, said at least one control program being activatable by signals of a telecommunication terminal device (1; 4; 5) in order to initiate at least one of a plurality of functions in the telecommunication terminal device, the central unit and/or in other telecommunication terminal devices (19; 20), wherein said at least one control program includes a person surveillance program, in which one or several specific keys of the terminal device have the function of a reset key, and in a remote terminal control program of the central unit an emergency signal or dialing a call number stored in the central unit is generated if the reset key, after activation of the person surveillance program, is not actuated within a time period presettably by a timer, wherein the presettable time period starts anew if the reset key is actuated within the time period.

23. Method for the operation of a telecommunication system with at least one central unit and at least one telecommunication terminal device, for communication with the central unit and/or other telecommunication terminal devices, said at least one central unit (3) including at least two control programs stored therein, comprising the steps of activating at least one control program by signals of a telecommunication terminal device (1; 4; 5) in order to initiate at least one of a plurality of functions in the telecommunication terminal device, the central unit and/or in other telecommunication terminal devices (19; 20), and providing a warning device, which, with a person surveillance program activated in the central unit after passage of a predetermined time interval during a warning interval, generates a visual and/or acoustic warning signal, wherein an emergency signal is generated if the reset key is not actuated after the start of the warning signal within a warning interval, wherein the time interval starts anew after actuation of the reset key.

24. Method for operating a telecommunications system having at least one central unit (3) and at least one telecommunications terminal device (1; 4; 5; 31) for communication with said at least one central unit (3) and/or other telecommunications terminal devices (19; 20) via at least one telecommunications network (2; 6; 7; 16; 17), wherein said at least one central unit (3) is implemented in the telecommunications network (2; 6; 7; 16; 17) and in said at least one central unit (3) a plurality of control programs are stored, wherein said plurality of control programs are activatable by signals of the telecommunications terminal device (1; 4; 5; 31) in order to trigger one or more functions in the telecommunications terminal device (1; 4; 5; 31), the central unit (3) and/or in other telecommunications terminal devices (19; 20), the method comprising the steps of activating a room monitoring program (9) in order to transmit noises picked up by a microphone of a terminal device (4) via at least one telecommunications network (6; 19) to said at least one central unit (3) and on to another terminal device (19), operating an active emergency call program (10) which is activated when a certain emergency call key is actuated in the terminal device (4) so that subsequent steps specified by the active emergency call program (10) are initiated and carried out by said at least one central unit (3), and operating a people surveillance program (11) in which one or more particular keys of the terminal device have the function of a reset key (36) and, in a remote terminal control program of said at least one central unit (3), an emergency signal or a call to the line number stored in the central unit is generated if after activation of the people monitoring program the reset key is not actuated within a period of time predetermined by a timing circuit (48), wherein the predeterminable period of time starts afresh when the reset key is actuated within the period of time and that a passive emergency call program (12) in association with the terminal device (5) and a movement sensor connected to the terminal device (5) generates an emergency call signal if for a certain period of time the movement sensor does not issue an adequate movement signal.

25. Telecommunication system comprising at least one central unit and at least one telecommunication terminal device, for communication with said at least one central unit and/or other telecommunication terminal devices, wherein in said at least one central unit (3) at least one control program is stored which operates as a call transfer program (8), a room monitoring program (9), an active emergency call program (10), a person surveillance program (11), a passive emergency call program (12), a remote terminal control program (13) and a program for monitoring the connection time (14), said programs are activatable by signals of the telecommunication terminal device (1; 4: 5) in order to initiate at least one function with respect to call transfers, room monitoring, active emergency calling, person surveillance, passive emergency calling, remote terminal controlling and monitoring the connection time in the telecommunication terminal device, said at least one central device and/or in other telecommunication terminal devices, and means for recognizing specific calls or call numbers of a called telecommunication terminal device by means of a control program of the central unit, wherein in the presence of such a specific call without activation of a call indicator device a connection between the caller and the called telecommunication terminal device is established.

* * * * *